United States Patent Office 3,167,983
Patented Feb. 2, 1965

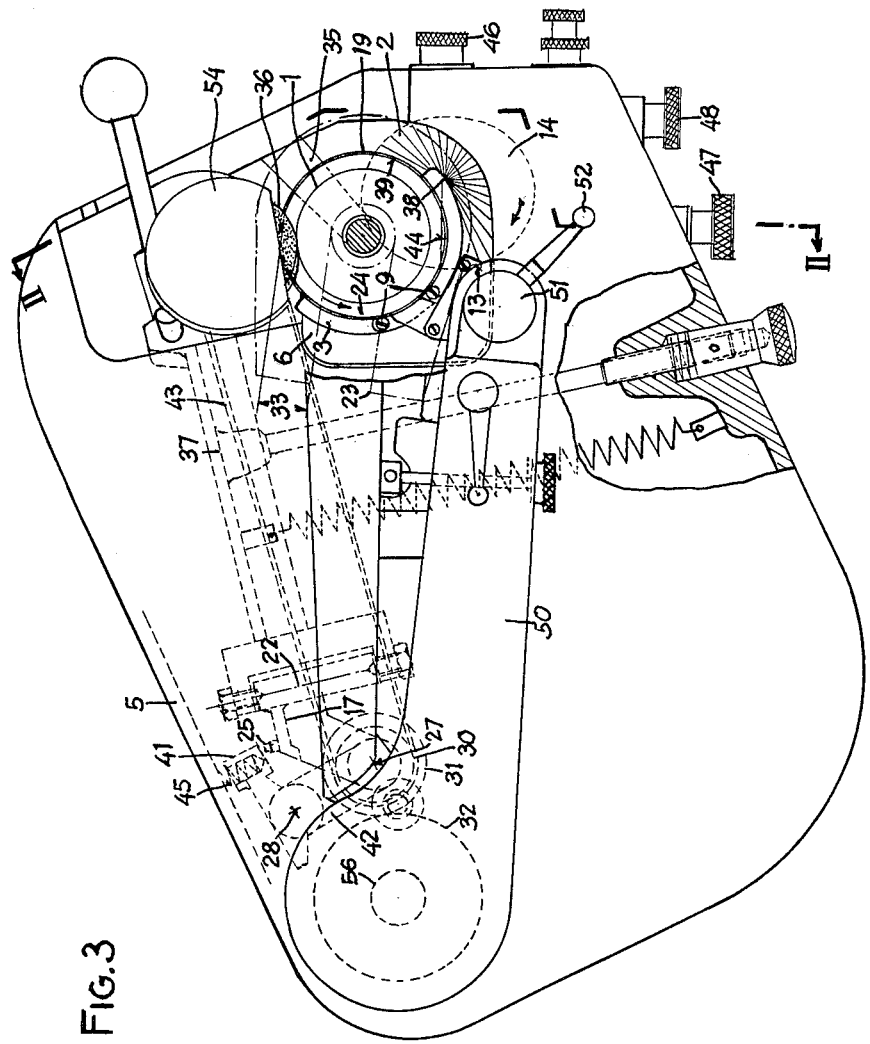

3,167,983
SLITTING MACHINE FOR INCISING THE EDGES OF FLEXIBLE WORKPIECES
Dieter Braun, 6 Dinkelsbuhlstrasse, Stuttgart-Bad Cannstatt, Germany
Filed June 6, 1962, Ser. No. 200,459
7 Claims. (Cl. 83—4)

This application is a continuation-in-part application of applicant's copending application Serial No. 192,938, filed May 7, 1962, now abandoned.

The present invention relates to a cutting machine for relatively flexible materials such as leather, plastics or the like, more particularly, to improvements in such a cutting machine having a circular slitting knife mounted in a horizontal cutting plane with guide members arranged above and beneath the circular slitting knife, a conical advance or feeding member, a depth stop member and a knife grinder for the circular slitting knife wherein the cutting machine is capable of slitting concave and convex arcuate edges of work material and slitting concave arcuate slits the curvature of which extends over an angle of up to 180°, this curvature being smaller than the curvature of the circular slitting knife.

The slitting process essentially consists in cutting the edge of an approximately horizontally positioned workpiece in parallel with respect to the surface of the workpiece for a predetermined depth to form upper and lower strips.

Cutting machines have been devised which have a continuously operating cutting edge by means of which slits can be made into the edge of a workpiece by advancing and withdrawing the workpiece substantially perpendicularly with respect to the knife-edge wherein the bottom or base of the slit is rectilinear. It is not possible with these machines to make slits in which the cutting line on the base of the slit is parallel with respect to the arcuate edges of a workpiece.

Machines are also known which are provided with a stationary or rotating slitting knife by means of which only rigid workpieces having a certain thickness, as for instance shoe soles, can be provided with slits substantially parallel with respect to the workpiece edge. The depth of the slit which can be obtained will depend on the rigidity of the work piece. The greater the rigidity of a workpiece, the further the workpiece can be unsupportedly extended from a guide member while being effectively cut by the slitting knife. With extremely rigid workpieces, the cutting depth can amount to approximately five times the thickness of the workpiece, whereas in non-rigid workpieces the obtainable cutting depth would be so slight as to have no practical significance. In non-rigid workpieces, a cutting depth ranging up to approximately the 20 to 30 times the thickness of the workpiece is generally required.

Another machine is known in which a sufficient rigidity is temporarily imparted to a non-rigid workpiece by pressing the workpiece between a cone-shaped advancing member and an upper guide member with the cutting member being positioned just beyond the pressure zone thus formed. In this machine, the upper guide member is arcuate and is provided with a guiding edge which is so positioned that the knife edge of the rotating knife is just directly behind the guiding edge. This guiding edge extends over a plane parallel with respect to the cutting plane of the knife. The length of the guide member is thereby limited to about 90° which corresponds to the length of the conical advancing member with which the pressure zone is formed. An entering stop member is positioned at one end of the guide at the point at which a workpiece is introduced into the pressure zone. A second, helical and adjustable stop member for limiting the depth of the slit is mounted opposite to the other end of the guide member above the body of the knife.

As soon as the advancing workpiece has passed beyond the guiding edge of the guide member, the workpiece is no longer compressed and the knife cuts with a dragging motion the first slit into the just released workpiece at that part of the workpiece edge which first protrudes from the pressure zone into the beginning of the cutting zone.

Although the pressure on the workpiece is released when the workpiece emerges from the pressure zone, the workpiece is still substantially rigid due to the small distance between the pressure zone and the knife-edge. After the cutting of the slit, the increasing lack of rigidity of the workpiece as the workpiece continues to emerge from the pressure zone is no longer important. Care must be taken to insure that the slit workpiece does not contact the knife-edge. This is achieved by mounting a protective member covering that part of the knife-edge positioned outside of the operating zone of the rotating knife. This protective member serves simultaneously as another lower guide member for the workpiece and to protect against injuries from the knife-edge.

In this structure the position and direction of rotation of the feeding or advancing member with respect to the knife as well as the shape of the feeding member are important since the feeding member not only produces the pressure zone but also feeds the workpiece therethrough. The feeding member is conical with the apex thereof positioned outwardly of the periphery or cutting edge of the knife. The axis of rotation of the conical feeding member is so inclined with respect to the cutting plane of the knife that a line on the surface of the feeding member extending from the apex to the periphery thereof, termed a directrix, is positioned within the operating zone of the cutting edge of the knife. Further, this directrix is positioned between a secant drawn across the two end points of the operating zone of the circular edge of the knife and a tangent drawn parallel with this secant at the periphery of the knife. The directrix is then positioned in a plane which is parallel with respect to the cutting plane of the cutting knife. A portion of this directrix ranging from 50 to 75% is a secant with respect to the circular edge of the knife. The remaining portion of the directrix is positioned outside of the circumference of the knife.

In view of the conical shape of the feeding member there is a greater feeding movement at the end of the operating zone remote from the apex of the feeding member than in the other end of the operating zone which is closer to the apex of the feeding member.

As a result the slitting process is initiated in the workpiece in the remote end of the operating zone. With this machine only comparatively flat arcs whose radii are greater than the radius of the circular cutting member can be slit. These machines cannot be used to slit concave arcs whose radii are smaller than the radius of the circular cutting member wherein, in addition, these arcs extend over an angle ranging up to 180° as with a curve, for instance, on the front pieces of shoes.

In order to cut such a workpiece the slitting machine must have the following characteristics:

(1) The pressure zone for the workpiece must extend further than the range of the feeding member. Such a pressure zone does not exist in the guide members of the cutting machine described above.

(2) The workpiece must be guided through an angle of 180° around a stop member which limits the depth of the slit. In the above machine the workpiece cannot be guided through an angle of 180° around the helical depth limiting member since the diameter of the limiting member is continuously increasing. In addition, the mounting of protective shielding structure adjacent the knife edge prevents the knife from engaging the workpiece in a small arc whose radius is less than that of the cutting member.

(3) The finish grinding device must not hamper in any way either the introduction of the workpiece or the slitting operation at the end of an angle of 180°. Mere elimination of the entering stop member would not enlarge the operating range of the cutting member since the slit can only be made directly behind a pressure zone formed in part by the entering stop member.

It is a requirement, however, that cutting machines must be able to slit interior or concave arcs as described above in order to increase the versatility of the cutting machine. If the cutting machine is not capable of slitting such arcs then the cutting machine has only a very limited use.

It is therefore the principal object of the present invention to provide a novel and improved cutting machine for slitting workpieces of a relatively flexible material such as leather or the like.

It is a further object of the present invention to provide a slitting machine for relatively flexible materials wherein the circular cutting member has an operating zone of up to 180° and the machine is capable of slitting concave slits having radii less than the radius of the circular cutting member.

The present invention discloses a cutting machine which incorporates the desired characteristics of cutting machines as discussed above and which eliminates the disadvantages of known cutting machines.

The cutting machine of the present invention has a pressure zone extending over 180° over the circular cutting member. This pressure zone is formed by an upper guide member which extends over 180° of the cutting member, a conical feeding member positioned below the cutting member and extending over a portion of the 180° angle, and a resiliently mounted lower guide member which is positioned adjacent the conical feeding member and beneath the upper guide member. Spring means are provided to resiliently urge the lower guide member upwardly against a workpiece introduced into the pressure zone. The end of the lower guide member adjacent the conical feeding member is shaped to conform to the circumference thereof. Thus, the pressure zone of this improved cutting machine is formed by eliminating the aforementioned lead-in stop member which is positioned above the cutting knife, by extending the upper guide member and by positioning a lower guide member beneath the upper guide member and adjacent to the feeding member.

The previously existing knife protecting member is now positioned concentrically with respect to the periphery of the cutting member and extended to cover an angle of about 180°. This protecting member is so fastened that its supporting structure extends to the zone of the stop member for limiting the depth of the slit and accordingly no longer obstructs the circular cutting guide for a workpiece. As a result of this structure, the upper guide member and the knife protecting member encompass the entire periphery of the circular cutting member with the radii of the concentric edges of the guide member and protecting member being somewhat greater than the radius of the circular cutting member.

The conical feeding member is mounted so as to be displaceable in two intersecting directions in order to compensate for different sizes of the circular cutting members and the upper and lower guide members. In addition, the adjustability of the feeding member can be used to vary the advancing movement of the workpiece into the pressure zone.

In order to cut arcs of small radii, a circular member is used for limiting the depth of the slit. A second guide member which may be of transparent material is mounted above the stop member in order to prevent the upper strip of a slit workpiece from becoming disengaged from the stop member.

When a helical depth stop member is used for normal operations, the stop member is fixedly mounted on the bearing housing of the cutting knife driving shaft. Since the bearing housing is rotatably positionable in the frame of the cutting member, the desired cutting depth of the slit can be set merely by rotating the bearing housing. That portion of the cutting mechine frame which houses the cutting knife driving shaft is mounted for pivotal movement about a horizontal axis so as to provide free access for interchanging the cutting member, the guide members and the depth stop member.

The conical surface of the feeding member is polished because the workpiece must slide on this feeding member when passing through the pressure zone.

A grinding wheel assembly is provided for periodically sharpening the cutting edge of the circular cutting member. The grinding wheel assembly is pivotally mounted so as to be positionable to its normal position during the cutting operation which is below the cutting plane of the cutting member. A clutch is provided which is automatically actuated when the grinding wheel assembly is pivoted to the grinding position. This clutch serves to then engage the grinding wheel assembly with a source of power.

Other objects and advantages of the invention will be apparent upon reference to the accompanying description when taken in conjunction with the following drawings wherein;

FIGURE 3 is a top plan view of the cutting machine of the present invention with portions of the casing being cut away to clarify illustration of the invention.

Figure 1:
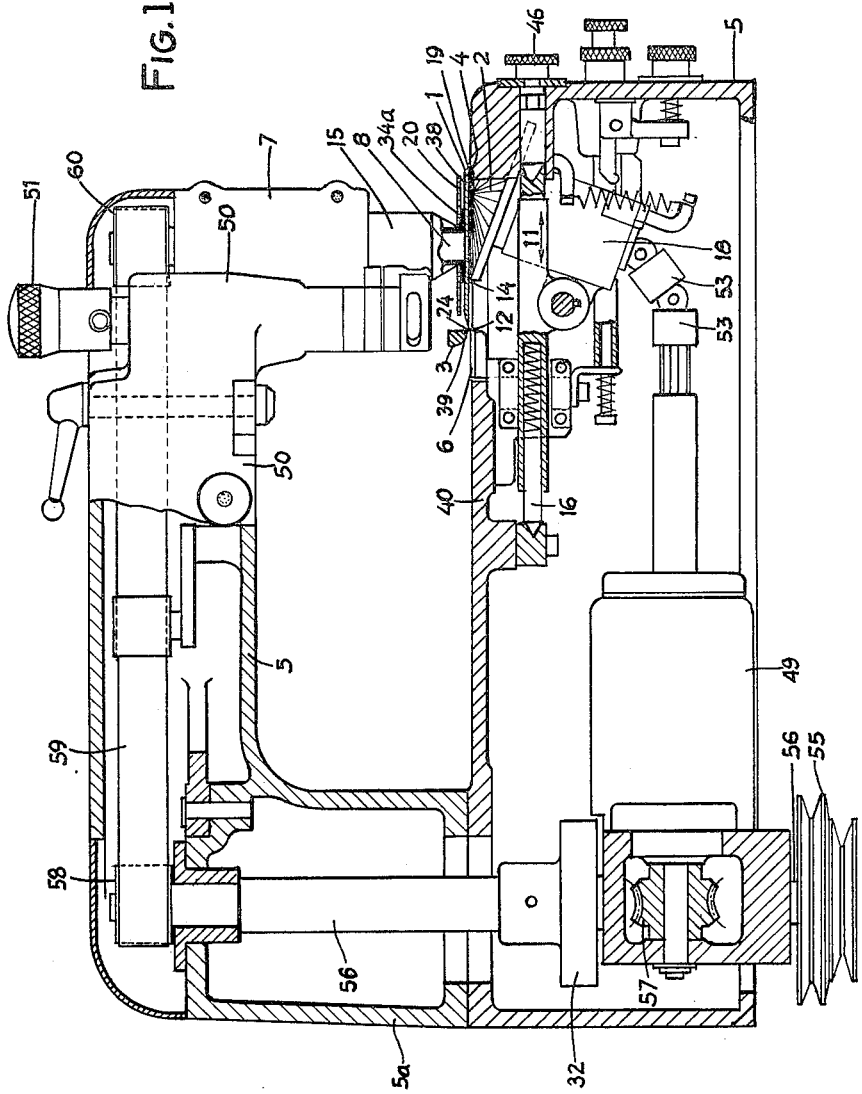
FIGURE 1 is a side elevational view of the cutting machine of the present invention with a section being taken through the machine casing to illustrate the relative positions of the components of the invention.
Figure 2:
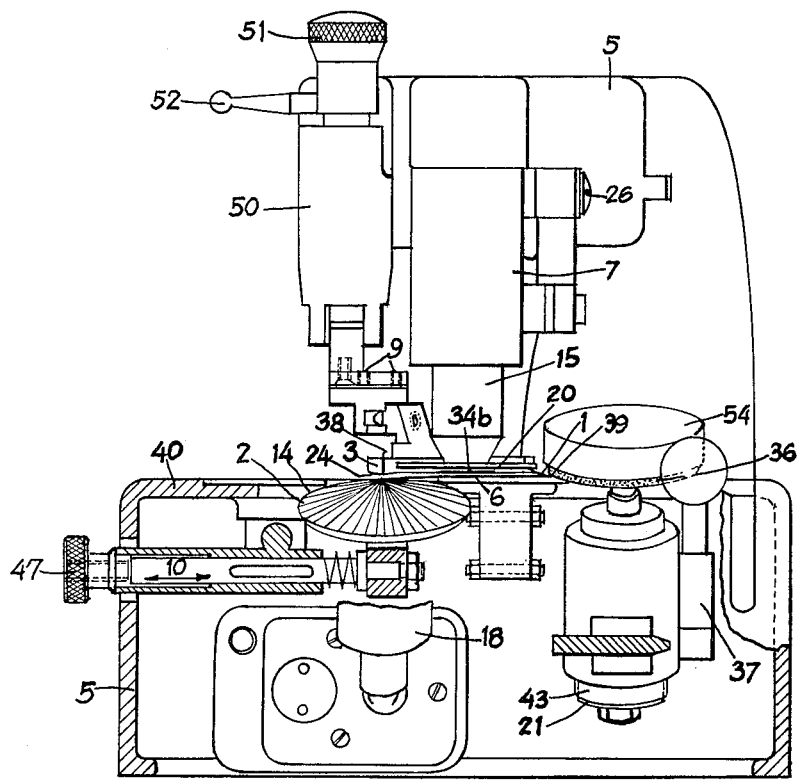
FIGURE 2 is a front elevational view of the cutting machine illustrated in FIGURE 1 with a section being taken along a line II—II shown in FIGURE 3.

A specific embodiment of the present invention is illustrated in the several views of the drawings wherein like reference symbols indicate the same parts throughout the various views. The cutting machine comprises a casing 5 upon which is mounted a vertically upstanding supporting column 5a. A horizontally extending supporting arm 50 extends from the top of the supporting column 5a and has on its outer end a vertical arm 7 which is pivotally mounted about a horizontal shaft 26. Extending from the lower part of the vertical arm 7 is a bearing housing 15 from which extends a driving shaft 8 upon whose end is mounted a circular cutting member 1 for counterclockwise rotation and having a cutting edge 39 about the periphery thereof. The bearing housing 15 is rotatably positionable in the vertical arm 7.

The cutting plane of the circular cutting knife 1 is positioned slightly above a supporting plate 40 which forms the top surface of the machine casing 5.

Also mounted on the outer end of the supporting arm 50 is mounting 9 upon which is secured an upper guide member 3 having a guide edge 24. The upper guide member 3 is adjustable in a known and conventional manner by means of an adjusting screw 51 and detachable by means of a lever 52. The upper guide member 3 extends over approximately 180° of the cutting edge 39 of the circular cutting knife 1. As can be seen in FIGURE 1, the guiding edge 24 is positioned outwardly from the cutting edge 39 only by a very small distance.

A stop member for limiting the depth of the slit may be either helical 34 or circular 34b and is mounted on the bearing housing 15. Directly above this depth stop member a pressure pad 20 is mounted to function as a second upper guide member. The pressure pad 20 is preferably constructed of a transparent material in order to enable the machine operator to observe at all times the guidance of the workpiece against the cutting member.

A polished conical feeding member 2 having an apex 38 and a peripheral edge 14 is mounted for clockwise rotation below cutting knife 1 in a bearing housing 18. The driving shaft upon which the feeding member 2 is mounted is driven through a universal joint 53 which is driven by a variable speed transmission gear system 49. The gear system 49 is powered through a worm gear 57 which is drivingly connected to a shaft 56 upon which is fixedly mounted a belt pulley 55. A driving belt, which is not shown, drivingly connects the pulley 55 with a power source. The variable speed transmission gear system 49 enables the speed of the feeding member 2 to be controlled so as to correspond to the speed of the cutting member 1 which in turn will depend upon the characteristics of the material which is being slit.

The upper end of the shaft 56 has a belt pulley 58 thereon which is drivingly connected by a belt 59 to a belt pulley 60 mounted on the upper end of the cutting member driving shaft 8. In addition, a driving friction gear 32 is mounted on the shaft 56.

The apex 38 of the feeding member 2 is positioned either beneath or slightly outside of the cutting edge 39 of the knife 1. The position of the feeding member apex 38 can be displaced in two intersecting directions as indicated by the double-ended arrows 10 and 11. This adjustment is accomplished by the adjusting knobs 46, 47, and 48 and is accomplished in a conventional and well-known manner utilizing a spring-biased rod 16. The position of the feeding member is varied according to the diameter of the circular cutting member 1.

The feeding member is not exchanged when different sizes of cutting members are employed. For this reason the circumferential speed of the feeding member must be adjustable to conform to the circumferential speeds of the different sizes of the cutting members. In addition, it is to be noted that the speed and direction in which the work piece is advanced into the cutting member is a function of the circumferential speeds of various points along the feeding member as well as of the circumferential speed of the cutting edge of the knife.

A first lower guide member 6 is formed so that its upper surface is coextensive with the upper surface of the supporting plate 40. The lower guide member 6 is in the form of a pressure plate, is vertically urged upwardly by a spring and is adjustable with respect to the cutting plane in a manner known per se. One edge 12 of the lower guide member 6 is closely adjacent to the cutting edge 39 of the cutting member and another edge 13 is closely adjacent to the edge 14 of the feeding member 2.

A second lower guide member 4 which also functions as a protecting shield against the knife edge 39 is mounted on support 35 directly beneath the circular cutting member 1. This lower guide member 4 is adjustable to various diameters of the circular cutting knife so that the lower guide member 4 is always positioned concentrically with respect to the knife edge 39 and the radius of its edge 19 is always somewhat greater than that of the corresponding circular cutting member 1.

The lower guide member 4 extends from one end of the upper guide member 3 close to the apex 38 of the feeding member 2 to approximately the other end of the upper guide member 3. As a result, the knife edge 39 is almost completely encompassed by the effective edge 24 of the upper guide member 3 on one side and on the other side by the effective edge 19 of the lower guide member 4. Thus, the pressure zone of a workpiece is formed between the upper guide member 3, the feeding member 2 and the lower guide member 6. The maximum pressure of the pressure zone is effected just beneath the guide edge 24 on the upper guide member 3.

In order to periodically sharpen the cutting edge 39 of the cutting member 1, a grinding wheel assembly 54 is provided which comprises a grinding wheel 36 mounted on one end of a shaft which has on its other end a belt pulley 21. The grinding wheel assembly is mounted on the free end of a grinding arm 37 which is mounted for pivotable movement about a horizontal axis 22. The axis 22 is formed upon a supporting member 17 which is pivotally mounted about a vertical shaft 27 which, in turn, is mounted in a bearing member 42 which is pivotally mounted about a vertical shaft 28. An abutment 41 is mounted on the bearing support 42 and is engageable by a stop member 25 mounted on the supporting arm 17. A spring 45 is mounted between the machine casing 5 and the abutment 41 so as to urge pivotal movement of the bearing support 42 in a clockwise direction.

A friction gear 31 and a belt pulley 30 are mounted on the vertical shaft 27 and a belt 43 drivingly connects the belt pulley 30 with the grinding wheel assembly belt pulley 21.

As shown in FIGURE 3, the grinding wheel is in grinding engagement with the cutting edge of the cutting member 1. When the grinding operation is finished, the grinding wheel assembly and its grinding arm 37 are pivoted in a counterclockwise direction about the vertical shaft 27 to disengage the grinding wheel from the cutting member. Continued pivoting of the grinding arm 37 in this direction brings the stop member 25 in engagement with the abutment 41. Accordingly, the bearing support 42 is pivoted about the vertical shaft 28 and the friction gear 31 is disengaged from friction gear 32. In order to regrind the circular cutting member it is merely necessary to pivot the grinding arm 37 in the reverse or clockwise direction whereby the grinding wheel is brought into engagement with the cutting member and the friction gears 31 and 32 are engaged to power the grinding wheel assembly. When the grinding wheel assembly is disengaged from the cutting member the grinding wheel assembly may be pivoted about the horizontal axis 22 to position the grinding wheel assembly below the cutting plane of the cutting member.

In the specific embodiment of the invention as shown in the drawings the horizontal directrix of the feeding member 2 is indicated by the dash-dotted line 44 shown in FIGURE 3. This directrix 44 covers a portion of the 180° embraced by the upper guide member 3. The remaining portion of this 180° is encompassed by the lower guide member 6. The lower guide member may have a form other than that of the pressure plate as shown in the drawings. This lower guide member may also comprise rolls or the like.

When the diameter of the circular cutting knife 1 is changed and the guide members are also changed, then it is necessary to displace the position of the directrix 44.

Reference to FIGURE 3 will reveal that the depth of the slit possible with the structure as illustrated in FIGURE 3 is indicated at 33.

As also shown in FIGURE 3, a workpiece 23 is introduced into the pressure zone approximately in the center of the upper guide member 3 between the upper guide member 3 and the pressure plate 6 or the feeding member 2, respectively. Upon leaving the pressure zone, the workpiece 23 is slit by the knife edge 39 into upper and lower strips.

Thus, it can be seen, that the present invention discloses a slitting machine for leather and the like wherein a greatly extended pressure zone is formed which permits the use of the slitting machine for further slitting operations.

It will be understood that this invention is susceptible to modification in order to adapt it to different usages and conditions, and, accordingly, it is desired to comprehend such modifications within this invention as may fall within the scope of the appended claims.

What I claim is:

1. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member.

2. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a second upper guide member concentric to said cutting member and pressing against the upper slit portion of a workpiece, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member.

3. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member, a circular depth stop member adjacent said cutting member for limiting the depth of the slit in a workpiece by said cutting member.

4. A slitting machine for incising the edges of workpieces of relatively flexible material, and comprising a frame including a vertical arm, a bearing housing rotatably mounted in said vertical arm, a cutting shaft mounted in said bearing housing, a rotary circular cutting member mounted on said cutting shaft and positioned in a horizontal cutting plane, an upper guide member mounted above said cutting member and having a guide edge extending over about 180° of the periphery thereof, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member and a helical depth stop member fixedly mounted on said bearing housing for limiting the depth of the slit in a workpiece by said cutting member.

5. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a rotary feeding member having a substantially conical shape positioned below said cutting member and effective over a portion of the 180° of which said guide edge extends with the conical surface of said feeding member being polished, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member, said first lower guide member having a second guide edge adjacent said conical feeding member and said first guide edge thereof being adjacent the periphery of said cutting member, and a variable speed transmission gear system drivingly connecting said feeding member to a power source.

6. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member, and a pivotally mounted grinding wheel assembly normally positioned below the cutting plane of said cutting member out of the range of said cutting member and pivotable to a position wherein said grinding wheel assembly being mounted on the end of an arm pivotally mounted for movement above a horizontal axis and for pivotal movement about two spaced vertical axes.

7. A slitting machine for incising the edges of workpieces of relatively flexible material, and comprising a rotary circular cutting member positioned in a horizontal cutting plane, an upper guide member mounted above said cutting member and having a guide edge extending over about 180° of the periphery thereof, a rotary feeding member mounted below said cutting member and effective over a portion of the 180° over which said guide edge extends, a first lower guide member positioned below said cutting member beneath said upper guide member and adjacent said feeding member and having a guide edge effective over the remaining portion of said 180°, said first lower guide member being resiliently vertically displaceable, a second lower guide member mounted below said cutting member and having a guide edge concentric thereto, the guide edges of said upper and said second lower guide members extending over the entire periphery of said cutting member and the radii of said guide edges being greater than the radius of said cutting member, and a support arm pivotally mounted about a vertical axis on the free end of said supporting arm, a grinding wheel assembly on the free end of said arm and having a belt pulley on the shaft thereof, a friction gear and a second belt pulley, a second friction gear diven by a power source and engageable with said first friction gear, a spring acting against said supporting arm to urge said friction gears into engagement, and an abutment on said arm end engageable with said stop member when said arm is pivoted to disengage said grinding wheel from the cutting member whereby said supporting arm is pivoted about its axis and said friction gears are disengaged.

References Cited by the Examiner
FOREIGN PATENTS 1,242,235  8/60  France.

ANDREW R. JUHASZ, *Primary Examiner.*

WILLIAM W. DYER, Jr., *Examiner.*